UNITED STATES PATENT OFFICE.

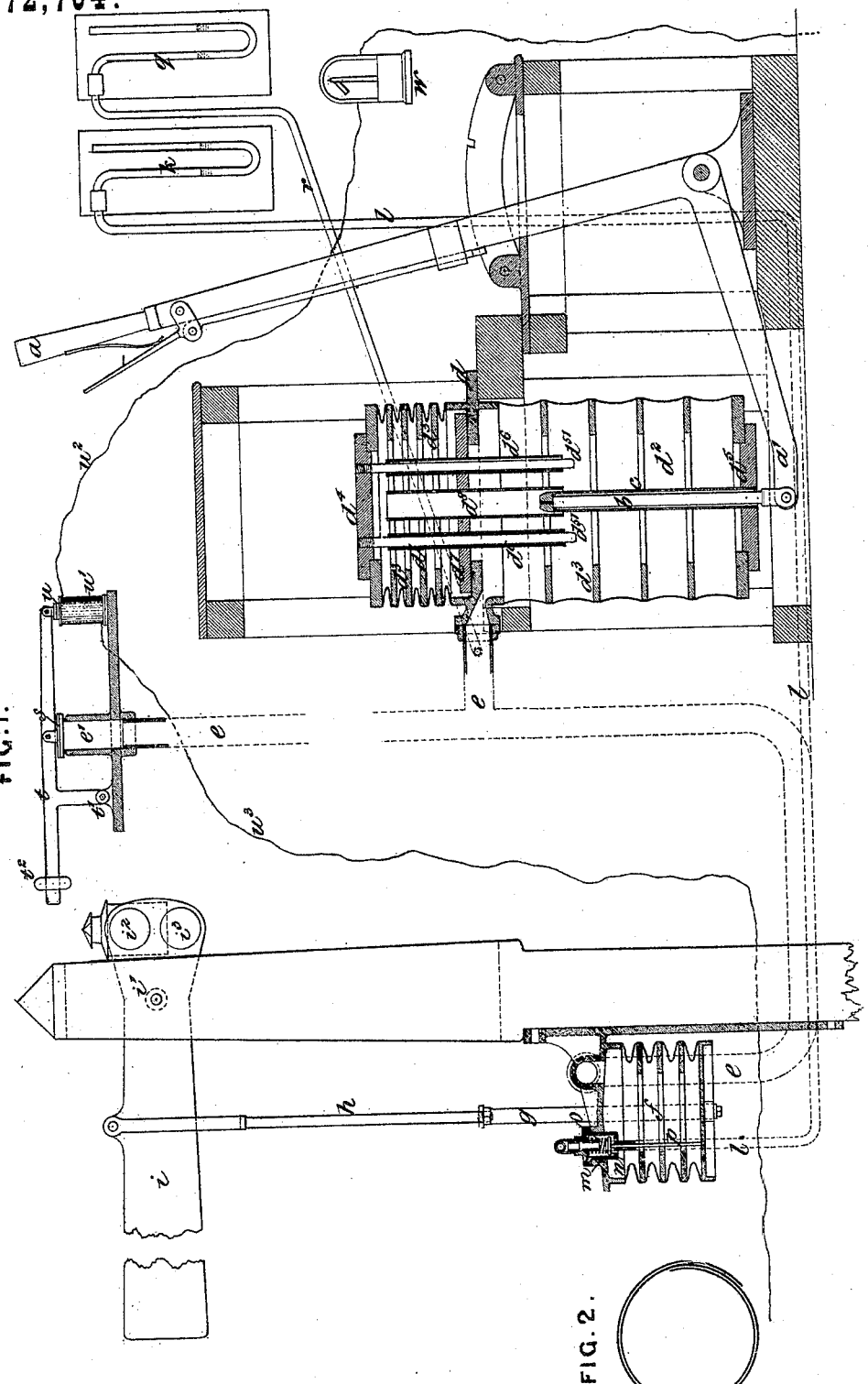

AUSTIN CHAMBERS, OF LONDON, ENGLAND.

IMPROVEMENT IN PNEUMATIC SIGNALS FOR RAILWAYS.

Specification forming part of Letters Patent No. 172,704, dated January 25, 1876; application filed October 18, 1875.

*To all whom it may concern:*

Be it known that I, AUSTIN CHAMBERS, of London, No. 258 Marylebone Road, in the county of Middlesex, Kingdom of Great Britain and Ireland, signal-engineer, have invented certain Improvements in Pneumatic Signals for Railways, of which the following is a specification:

This invention has reference to signaling apparatus in which the signalling objects or bodies are moved pneumatically, and has for its object to combine simplicity of construction with ease and rapidity of working, and to preclude the assumption of the "safety" or "pass-on" position by the signaling object or body in the event of breakage or failure of intermediate parts of the apparatus.

To expedite the operation of moving over the lever or handle to the necessary extent for changing the position of the signaling object or body, I employ a compressor so constructed and connected with the actuating lever or handle as that by the compression of the elastic fluid, effected by moving over the lever or handle, the resistance shall be overcome of a portion of the compressor, the capacity of the compressor being thereby temporarily augmented beyond that which obtains when the operation of compression has been completed—the latter capacity being attained by the automatic return to the original position, or nearly so, of the part or parts of the compressor whose resistance to outward or extensible movement shall have been temporarily overcome by the movement of the lever.

Instead of actuating the signaling objects or bodies by compression of elastic fluid, it may be done by rarefaction, for which purpose apparatus as above described may be arranged to operate inversely.

The compressors, rarefiers, and collapsible vessels I, by preference, construct mainly of flexible material, such as sheet india rubber, and in order to guard against failure through leakage, while at the same time securing a maximum amount of flexibility, I use thin sheets of such flexible material, which I fasten together in two or more layers by the interposition of suitable adhesive substance, the layers of flexible material being so arranged as that the joint or junction of the inner thickness or layer shall be amply covered, strengthened, and protected by one or more superposed layers of the same material.

One sheet of flexible material may be so wound around a block or cylindrical object as to cause one part of such sheet to overlap another, and so to form the several layers without breakage of the continuity of the material.

I so arrange and dispose the weight of the signaling objects or bodies that they shall have to be drawn down when required to assume the "safety" or "pass-on" position, and that when the normal pressure of the external atmosphere prevails in the pipes, tubes, and vessels of the apparatus the signaling object shall automatically resume the "danger" position.

I provide the following arrangement where necessary for indicating at any required place when the signaling object has resumed or occupies the "danger" position: A U-shaped liquid-gage, or other pressure-gage, placed in the situation at which the indications are required, is connected, by a pipe, tube, or passage, with a valve-chamber fixed to the collapsible or expanding and contracting vessel, constituting the means of actuating by changes of fluid-pressure the signaling object or body. A passage is formed between the valve-chamber and the interior of the collapsible vessel, the orifice of which passage is provided with a valve pressed against its seat by a spring or weight.

When the collapsible vessel is expanded, the signaling object being in the "safety" position, the valve will be closed; but when the collapsible vessel is collapsed, the valve will be moved from its seat, thus establishing communication between the interior of the collapsible vessel and the gage, and by the change of pressure effecting the required indication. In juxtaposition to the above-named gage I arrange a second gage, which I place in communication with the interior of the compressor or air-pump, whereby the changes of pressure are effected, so that the showing of different pressures by the two gages shall indicate that the collapsible vessel has not returned to the "danger" position.

The two gages must show the same pressure when the collapsible vessel has opened the valve by returning to the "danger" position, and has thus established free communication between the two gages.

In cases where it is desired that the concurrence of two or more persons stationed at different places shall be an essential preliminary to the moving of the signaling object or body into the "safety" or "pass-on" position, I provide in some convenient elastic fluid-containing portion of the apparatus an escape-opening furnished with a balanced valve-lid or closure arranged to be fastened in its closed position by means of a locking or holding arrangement operated by electricity from the place whence it is required to govern the moving of the signaling object into the "safety" or "pass-on" position.

The locking arrangement may be in the form of a catch, or the armature of an electro-magnet may be connected to the valve-lid or closure, and so be made to serve for holding it in the closed position when required.

By this arrangement, assuming the lever whereby the compressing or rarefying apparatus (as the case may be) is worked, or by which communication is, when required, established between the collapsible vessel and a reservoir of compressed elastic fluid or a vessel in which a partial vacuum is maintained, to be moved into the position for "taking off" a signal, or, in other words, into the proper position for moving the signaling object or body into the "safety" or "pass-on" position, such movement of the said lever will exercise no influence upon the signaling object or body unless the valve or closure has been previously locked or fastened in its closed position, because, by reason of the arrangement of the apparatus, so long as the valve or closure remains unlocked the pressure within the elastic fluid-containing apparatus cannot be made to differ sensibly from the normal pressure of the external atmosphere, and while that pressure prevails within the apparatus the signaling object or body must of necessity be in the "danger" position.

It will be evident that this part of my invention may be so applied as to make the concurrence of any desired number of persons stationed at different places an essential preliminary to the moving of a signal into the "safety" position.

The valve-lid or closure and locking or holding arrangement may be inclosed in a suitable casing arranged to admit of the circulation of elastic fluid, but so as to preclude tampering with the apparatus.

When I in this specification use the words "signaling object or body" I desire it to be understood that I mean those words to include also any single set of signaling objects or bodies—as, for example, a semaphore-arm with its lenses operating in conjunction with a lamp or other well-known appliances for signaling on railways.

In order that others skilled in the art may be enabled to make and use my invention, I proceed to describe particularly the manner in which I prefer to carry it into practical effect.

In the accompanying sheet of drawings, Figure 1 is a longitudinal vertical sectional elevation of apparatus embodying my improvements; and Fig. 2 is a horizontal section, showing the mode of constructing the flexible portions of the collapsible vessels.

$a$ is the lever for actuating the signals. Its arm $a'$ carries a rod, $b$, which enters a tube, $c$. This tube is open at its lower end, which is fastened to the lower end of the compressor, into which the tube projects, the upper end of the tube being closed, as shown, with the exception of a small hole to admit air for the purpose hereinafter mentioned. The upper end of the rod $b$ serves as a valve to close the small hole. The central portion of the compressor consists, in the present instance, of a fixed flanged metal ring, $d$, having an opening through it, and communicating by a pipe, $e$, with the collapsible vessel $f$, by whose motions the semaphore-arm is actuated. The lateral portions of the upper part $d^1$ and lower part $d^2$ of the compressor are formed of flexible material, such as sheet india-rubber fastened by the ordinary cement, but wrapped round in the novel manner shown in Fig. 2, rigid rings $d^3$ being introduced at suitable intervals, as well understood, to insure the collapsing of the compressor as required. The ends or covers $d^4$ $d^5$ are made heavy. The upper cover $d^4$ carries a couple of rods, $d^{51}$, working in guide-tubes $d^6$, carried by a plate or cross-piece, $d^7$, resting upon an internal ledge of the central portion or ring $d$. The plate or cross-piece $d^7$ also carries a central tube, $d^8$, for guiding the tube $c$. The collapsible vessel $f$ is made of flexible material, in the same way as, and with rings similar to, the compressor, and is suspended from a bracket attached to the signal-post, a part of which bracket forms the upper end of the collapsible vessel, whose lower end may consist of a metal plate, as shown. To the lower end of the collapsible vessel is secured a frame, $g$, connected by a forked rod, $h$, to the longer arm $i$ of the semaphore, whose fulcrum is at $i^1$. The shorter arm of the semaphore carries a danger-lens, $i^2$, and a safety-lens, $i^3$. The drawing shows the positions of the parts when the signal is at "danger." If the lever $a$ be now moved over in the direction indicated by the arrow, the lower portion $d^2$ of the compressor will be collapsed. The air within it, being compressed, will cause the upper portion $d^1$ to suddenly expand; but the weight of the end or cover $d^4$ and its attachments will cause the upper portion $d^1$ to move back toward its original position. The air within the compressor and tube $e$, being compressed by the downward movement of the end or cover $d^4$, will expand the collapsible vessel $f$, thereby drawing down the longer arm $i$ of the semaphore into the position indicating that a train may proceed. On then moving the lever *a* back into the position shown in the drawing, the rod *b* will be caused to move partly out of the tube *c*, the movement of the lever being more rapid than that of the lower end of the compressor, which, however, will gradually follow (expedited by air entering through the small hole in the end of the tube *c*) until it has resumed the position shown, and, by restoring the pressure within the compressor and pipe *e* to the normal or external atmospheric pressure, will have caused the partial collapse of the vessel *f* into the position shown in the drawing, thus restoring the signal to the "danger" position. It will be evident that, instead of the small hole in the end of the tube *c*, a suitable valve may be arranged either on the top or bottom of the compressor, or upon the air-pipe leading to the collapsible vessel *f*, which valve shall act automatically by the partial vacuum formed in the compressor, or may be so arranged as to open and close, as required, by the action of the compressor itself.

When the apparatus is to actuate the signal by rarefaction I connect the arm $a'$ of the lever *a* to the upper end $d^4$, and for the tube *c* in the lower part $d^2$ I substitute a simple guide-rod. I invert the collapsible vessel *f*, with its valve-chamber and valve, and connect what then becomes the upper end of the vessel *f* to the arm *i*. By this arrangement, assuming the lever *a* to be moved over so as to expand or move up the upper portion of the rarefier, the lower portion will, by the pressure of the external air, be temporarily collapsed, but will automatically resume its normal position, or a position approximating thereto, almost immediately, thereby completing the rarefaction of the elastic fluid, and, by causing the collapse or partial collapse of the vessel *f*, drawing down the signal-arm *i*.

*k* is a liquid pressure-gage placed in the situation at which the indications are required, and connected by a pipe, *l*, with a valve-chamber, *m*, containing a valve, *n*, kept by a spring, *o*, over and against a seat around an orifice leading into the collapsible vessel *f*. *p* is a rod fixed to the lower end of the vessel *f*, which rod, when the vessel is in its collapsed or partially-collapsed position, raises the valve *n* from its seat, as shown, thus establishing communication between the interior of the collapsible vessel and the gage *k*. *q* is a second gage, communicating with the interior of the compressor through a pipe, *r*. Should the collapsible vessel not at the proper time return to the "danger" position the fact will be indicated by the difference between the two gages.

$e'$ is an escape-opening, furnished with a valve, *s*, carried by a lever, *t*, having its fulcrum at $t^1$, and carrying an adjustable weight at $t^2$, which all but counterbalances the valve *s*. *u* is the armature of an electro-magnet, $u^1$, arranged in the same circuit, $u^2$, as the ordinary telegraphic indicator *w*, so that the same operation which changes the position of the indicator-pointer will also positively control the valve *s*, and, consequently, the moving of the signal into the "safety" or "pass-on" position. The telegraph-indicator will show the man in charge of the lever *a* when he may move over that lever to draw the signal down into that position.

The drawing assumes the electric current for the time being passing through the electro-magnet to be such as to attract the armature, thus holding the valve in its closed position, so that should the lever *a* be moved over the air in the compressor-pipe *e* and vessel *f* will be compressed, so as to bring down the signal. Assuming that the apparatus at the controlling-station be operated so as to reverse the current, the armature *u* will be released, so that the slightest increase of pressure in the pipe *e* will raise the valve *s* and permit the escape of fluid from the pipe *e*, thus rendering it impossible to draw down the signal by moving over the lever *a*. A stop is provided to prevent the lever being tilted too far.

It will be evident that the arrangements shown in the drawing may be modified to suit circumstances.

To meet cases where the signal is drawn down by rarefying the air in the pipe *e*, I invert the opening $e'$. I form around the aperture an internal seat for the valve *s*, which I arrange above the lever *t*, to which lever I connect the valve by a stem or equivalent means.

It will be evident that in this arrangement, when the armature is free, if the pressure in the pipe *e* be reduced in the slightest degree below that of the external atmosphere, the valve *s* will at once rise from its seat in the pipe, thus admitting air and maintaining in the pipe *e* and vessel *f* the normal pressure at which the signal is invariably in the "danger" position.

I claim—

1. In a pneumatic signaling apparatus for railways, the combination, with a hand-lever or handle, a pipe, tube, or passage charged with elastic fluid, and a collapsible vessel connected to the signaling object, of a compressor so constructed that, as one portion of the compressor is collapsed by moving the lever or handle to move the signal, another portion shall temporarily expand to receive the displaced fluid, and afterward complete the compression of fluid, and move the signal by automatically resuming its original position, or a position approximating thereto.

2. In a pneumatic signaling apparatus for railways, the combination, with a hand-lever or handle, a pipe, tube, or passage charged with elastic fluid, and a collapsible vessel connected to the signaling object, of a rarefier so constructed and connected to the lever that, as one portion of the rarefier is expanded or drawn out by the movement of the lever or handle to move the signal, another portion shall temporarily collapse to partially occupy the space vacated by the displaced fluid, and afterward complete the rarefaction of fluid and move the signal, as required, by automatically resuming its original position, or a position approximating thereto.

3. In pneumatic signaling apparatus for railways, the combination, with a collapsible vessel or chamber connected to the signaling object, a pipe, tube, or passage charged with elastic fluid, and apparatus for changing the pressure or density of said fluid, of two gages or indicators in juxtaposition, one connected by a pipe, tube, or passage, $l$, with a chamber, $m$, communicating with the interior of the collapsible vessel or chamber by a hole or passage governed by a valve, $n$, operated by a rod or projection, $p$, and the other gage or indicator communicating, through a pipe, tube, or passage, $r$, with the compressor or rarefier, so as, by the relative indications of the two gages, to show the position of the collapsible vessel that operates the signal.

4. In pneumatic signaling apparatus for railways, as means for controlling from a distance the moving of the signaling object, the combination, with an opening in a fluid-containing portion of the apparatus, of a valve-lid or closure, in conjunction with a locking or holding device operated by electricity from the point or station whence the moving of the signaling object is governed.

5. The combination of the tube $c$, attached to one end of a collapsible vessel, and having a small perforation in its upper end, with the rod $b$, attached to the lever-arm $a'$, and forming an air-valve with said tube, as set forth.

6. The compressor, consisting of the collapsible parts $d^1$ and $d^2$, united by a central rigid flanged ring, $d$, and provided with guide-rods or their equivalents, $c$ and $d^{51}$, working in tubes $d^8$ and $d^6$, carried by a plate or cross-piece, $d^7$, as hereinbefore described and illustrated, for the purpose specified.

7. In combination with a compressor constructed as shown, the pipe $e$, with its opening $e'$, valve $s$, lever $t$, weight $t^2$, armature $u$, and electro-magnet $u^1$, said pipe communicating with the collapsible vessel $f$, connected to the semaphore-arm $i$, as described and shown, for the purpose specified.

AUSTIN CHAMBERS.

Witnesses:
  H. S. WILES,
  *Clerk to Mr. Lloyd Wise,*
              *Patent Agent, London.*

E. KINGCOMBE,
  *Clerk to Messrs. David Burwash & Son,*
    *Public Notaries, 69 King William St.,*
                    *London.*